March 6, 1934.    C. L. GREGORY    1,949,714
PHOTOGRAPHY
Filed June 5, 1931
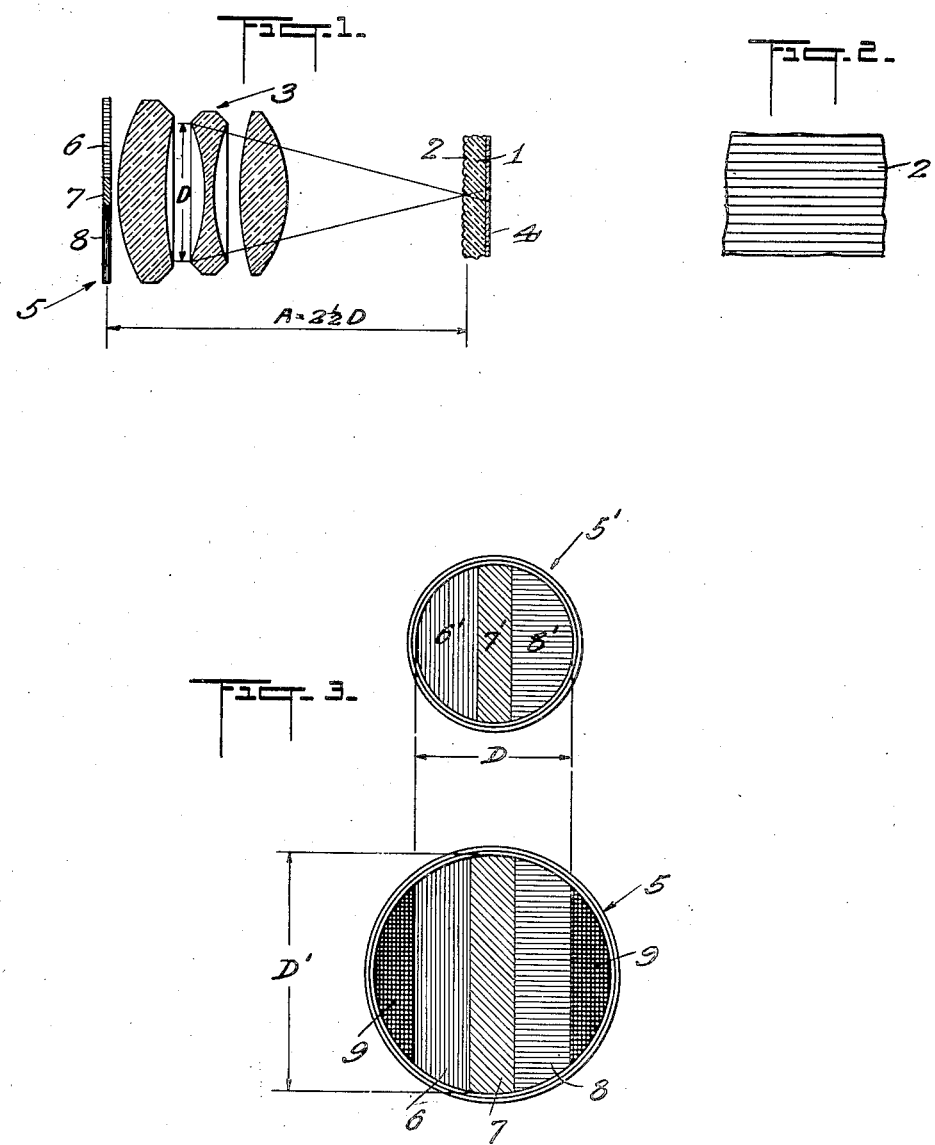
INVENTOR
Carl Louis Gregory
BY
Gifford, Scull & Burgess
ATTORNEYS.

Patented Mar. 6, 1934

1,949,714

UNITED STATES PATENT OFFICE 1,949,714

PHOTOGRAPHY

Carl Louis Gregory, New Rochelle, N. Y., assignor to Kislyn Corporation, Englewood, N. J., a corporation of Delaware Application June 5, 1931, Serial No. 542,227

2 Claims. (Cl. 95—2)

This invention relates to an improvement in the art of photography, the novel features of which will be best understood from the following description and the annexed drawing, in which is shown a selected manner in which the invention may be practiced, and in which:

Fig. 1 is a longitudinal sectional view through a portion of an optical system, this figure being diagrammatic in character and omitting structure which is not essential to an understanding of this invention.

Fig. 2 is a face view of a portion of the film appearing in Fig. 1.

Fig. 3 is a face view of a color filter constructed according to my invention, and showing its relation to the type of color filter used in the prior art.

Referring first to Fig. 1, I have shown therein a film 1 of the type having on its face a plurality of lenticular elements 2. These elements usually extend lengthwise of the film and are cylindrical in form, as indicated in Fig. 2, it being understood that the size of these elements is greatly exaggerated.

Associated with the film is an optical device, here shown as an objective 3, which is adapted to focus light upon the film in such a way that the lenticular elements will form minute images on the emulsion 4 of the film. Disposed in front of the objective 3 is a color filter or screen 5 having a plurality of zones 6, 7, and 8 extending parallel to the direction of the elements 2. These zones may be red, green, and blue, respectively. In other words, the screen may be of the type commonly referred to as a tri-color screen.

In ordinary practice of the manufacture of film having a goffered or lenticulated screen surface, the microscopically small cylindrical lenses embossed upon the film have an aperture of the order of F 2.5. While it is theoretically possible to produce film having a larger or smaller relative aperture of the lenticulated elements, there are a number of practical considerations which more or less limit microscopic lenses to this relative aperture of F 2.5.

As the focal length of the lenticulations must equal the thickness of the film and the aperture of the lenticulations must approximately equal the aperture of the taking and projecting objectives, it becomes a commercial necessity to choose a relative aperture not greater than that of objectives in ordinary use and yet not too small to prevent the taking of pictures at the short exposure intervals demanded by cinematography. Other considerations, such as the resolving power of emulsions and the necessity of keeping the physical size of the lenticulations small enough to prevent them from being objectionably visible on the screen, also limit the relative aperture of the lenticulations.

In order to increase the speed of the objective without affecting the color values photographed on the film, I increase the diameter of the screen to the size of the faster objective so as to admit more light during exposure of the film. The effective increase in the area of the screen or filter is confined to an area extending lengthwise of the elements 2.

The relation between my filter and the prior art filters will probably be best understood from an inspection of Fig. 3. In that figure, I have shown at 5' a filter designed according to prior art practice, and having an effective diameter D. The three zones 6', 7', and 8' are red, green, and blue, as usual in this type of filter. According to this invention, increased speed is achieved by increasing the effective aperture of the taking objective. This is done by increasing the diameter of the screen to D' in a direction lengthwise of the zones, it being understood, as stated above, that these zones extend parallel to the lenticulations 2 on the film, thus increasing the effective aperture vertically while retaining the same lateral effective aperture as that of the cylindrical lenticulations. The filter is preferably retained in its circular form, but its effective dimension transversely of the lenticulations is not changed. This result may be obtained by forming black or opaque areas or zones 9 on opposite sides of the zones 6, 7, and 8.

The effective aperture is determined by the formula:

$$\text{Aperture} = \frac{\text{focal length}}{\text{diameter}}$$

Therefore, according to my invention, by increasing the diameter lengthwise of the zones, I increase the effective aperture, or, in other words, increase the speed of the objective while still maintaining the correct relation between the zones of the filter and the lenticulations on the film.

While I have shown the invention as embodied in a specific form, it is to be understood that various changes in details may be made without departing from the scope of the invention, and I therefore do not intend to limit myself except by the appended claims.

I claim:

1. In combination, a film having minute cylindrical lenticular elements thereon and extending substantially parallel to each other, means to focus light upon said elements, a color filter having a plurality of zones extending parallel with said elements and disposed so that said light passes therethrough, the dimension of said filter in a direction transverse to the direction in which said elements extend being determined by the effective aperture of the lenticular elements, and the dimension of the filter in a direction parallel to that in which the elements extend being greater than the first-named dimension.

2. In combination, a film having minute cylindrical lenticular elements thereon and extending substantially parallel to each other, means to focus light upon said elements, and a color filter having a plurality of zones extending parallel with said elements and having a greater dimension in a direction parallel to that of said lenticular elements than in a direction transversely thereof.

CARL LOUIS GREGORY.